Patented Oct. 29, 1940

2,219,707

UNITED STATES PATENT OFFICE 2,219,707

NITROGENOUS CONDENSATION PRODUCT OF FLUORANTHENE AND PROCESS OF MAKING SAME

Walter Kern, Sissach, and Theodor Holbro and Richard Tobler, Riehen, Switzerland, assignors to Society of Chemical Industry in Basle, Basel, Switzerland No Drawing. Application September 6, 1938, Serial No. 228,688. In Switzerland September 14, 1937

19 Claims. (Cl. 260—276)

This invention relates to the manufacture of nitrogenous condensation products of fluoranthene by treating with a condensing agent a compound of the general formula $(R_1-NH)_n-R_2$, wherein $R_1$ is a residue of a compound capable of being vatted, which contains at least three condensed six-membered carbon rings as well as at least one carbonyl group, the carbon atom of which is a member of a six-membered ring, $n$ is at least 1 and $R_2$ is a fluoranthene residue.

The parent materials for the invention may be the compounds of the above formula obtainable by causing a halogen-substituted fluoranthene to react with such a compound capable of being vatted, which contains at least three condensed six-membered carbon rings, further at least one hydrogen atom combined with nitrogen, as well as at least one carbonyl group, the carbon atom of which is a member of a six-membered ring.

Such compounds are described for instance in the copending application Serial No. 228,687. In these products 1, 2 or more groupings $(R_1-NH)-$, which may be the same or different from each other, may be attached to one fluoranthene residue. Compounds capable of being vatted, which contain at least three condensed six-membered carbon rings, further, at least one hydrogen atom combined with nitrogen, as well as at least one carbonyl group, the carbon atom of which is a member of a six-membered ring, are, for example, anthraquinone derivatives or more highly condensed ring systems; examples are aminoanthraquinones, for instance 1-aminoanthraquinone and the 1-aminoarylaminoanthraquinones. Also especially aminoacylaminoanthraquinones, wherein the acyl residue which may be that of any acid, for instance an aliphatic, aromatic, aliphatic-aromatic or heterocyclic acid such as a carboxylic acid, for example 1-amino-4-benzoylaminoanthraquinone, 1-amino-5-benzoylaminoanthraquinone, 1-amino-5-benzoylamino-8-methoxyanthraquinone, 1-amino-5:8-dibenzoylaminoanthraquinone, 1-amino-5-acetylaminoanthraquinone, 1-amino-5-cinnamoylaminoanthraquinone, 1-amino-5-pyridoylaminoanthraquinone and 1-aminoanthraquinonoylaminoanthraquinones, also for example aminodibenzanthrones, aminodianthrones, aminoanthanthrones, amino-N-dihydroanthraquinone-azines, aminodibenzpyrene-quinones, aminoflavanthrones and aminopyranthrones and those aminoanthraquinone derivatives in which the 1- and 9-positions are members of a heterocyclic ring, for instance amino-1:9-anthrapyrimidines, amino-1:9-anthrapyridones, amino-1:9-isothiazolanthrones and amino-1:9-pyrazolanthrones; finally aminoanthraquinone derivatives in which two carbon atoms in ortho-position to each other are members of a heterocyclic ring system, as is the case for instance in the aminoanthraquinone-acridones. In addition to the above named aminoacylamino-anthraquinones there may be used such aminoacylaminoanthraquinones, the acyl radical of which represents the radical of propionic acid, butyric acid, stearic acid, phenylacetic acid, oxalic acid, succinic acid, halogenbenzoic acids, alkoxybenzoic acids, alkylbenzoic acids, naphthalene carboxylic acids, phthalic acids and quinoline carboxylic acids. All these compounds may contain further substituents. The parent materials for this invention are advantageously obtained by heating the components together in a solvent or diluent, for instance nitrobenzene, chloronaphthalene, dichlorobenzene, trichlorobenzene or amyl alcohol, in an open vessel or under pressure, and advantageously in the presence of a catalyst, for instance copper or copper compound, as well as in the presence of an acid binding agent, for instance alkali carbonate and/or anhydrous sodium acetate. Good results are obtained, especially with those products of the above general formula in which $n=2$ and $R_1$ is an anthraquinone residue which contains as a substituent at least one acylamino group, for instance benzoylamino group in 4- or 5-position.

The aforesaid grouping $(R_1-NH-)$ may be combined at any position of the fluoranthene residue, for example in 4-, 11- or 12-position as well as in any other position provisionally still unknown.

As condensing agents which have acid or alkaline character and may be used alone or, if desired, in combination with each other or together with an indifferent solvent or diluent, there may be named aluminium chloride, sodium amide, acetyl chloride, benzoyl chloride, chlorosulfonic acid and especially sulfuric acid of high per cent strength. The action of the condensing agent may occur at a low, medium, or if desired a greatly increased temperature.

For the condensing reaction it is of advantage that in both the residues $R_1$ and $R_2$ combined with the nitrogen atom each should carry at the position adjacent to the nitrogen atom a hydrogen atom or substituent which is easily exchanged.

The products obtained may be purified or converted into a form favorable for use by recrystallisation, reprecipitation or revatting. It may also be desirable as a final step following the treatment with the condensing agent to add a treatment with an oxidizing agent, if desired in aqueous acid medium, for example treatment with a nitrite, hypochlorite or perborate.

A modification of the process consists in causing the product obtained, insofar as it still contains at least one halogen atom substituent, to react with an amine containing a group capable of being vatted and, if desired treating the product thus obtained with a condensing agent.

Furthermore, the products obtainable by the invention may be after-treated with a halogenating agent, and this treatment may be conducted in an indifferent solvent or suspension agent or may be accompanied by the action of a condensing agent.

The products obtainable according to the present process correspond to the general formula $(R_1-NH)_n-R_2$, wherein $R_1$, $n$ and $R_2$ have the signification indicated above, and wherein a carbon atom of at least one radical $R_1$ adjacent to the NH-group is linked to a carbon atom of the fluoranthene radical $R_2$ adjacent to the NH-group, the expression "adjacent" comprising such carbon atoms which form the ortho or the peri-position. By the action of condensing agents on the named parent materials carbazola-like rings are produced.

The nitrogenous condensation products of fluoranthene obtained by the invention are valuable vat dyestuffs. They are suitable for dyeing and printing various fibers, for instance wool or silk. Especially, however, cellulosic fibers, for instance cotton and other vegetable fibres or artificial silk, such as that from regenerated cellulose as well as staple fiber therefrom and other artificial spinning fibers. They may be applied by the methods known for vat dyeing, for example by use of alkaline baths of medium strength or full strength with or without the addition of a salt; or they may be used in the form of leuco-ester salts, obtainable by the usual methods suitable for this class of dyestuffs; chiefly brown tints are produced of good to very good properties of fastness.

The following examples illustrate the invention, the parts being by weight:

*Example 1*

1 part of 5'-benzoylamino-1'-anthraquinonyl-4-aminofluoranthene of the probable formula

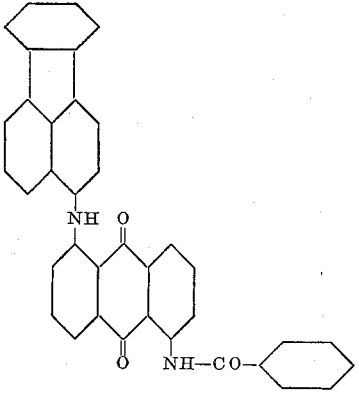

obtainable as described in Example 1, paragraph 1 of the copending application Serial No. 228,687 is introduced at 25° C. into 18.2 parts of sulfuric acid of 90 per cent strength, and the mixture is stirred for 8 hours at 25° C. It is then poured into ice, 0.3 part of sodium nitrite is added and the whole is stirred for 16 hours at 0–5° C. The dyestuff thus obtained is filtered, washed until neutral and made into a paste with water. It dyes cotton in a brown vat very fast greenish yellow brown tints.

*Example 2*

1 part of 4'-benzoylamino-1'-anthraquinonyl-4-aminofluoranthene of the probable formula

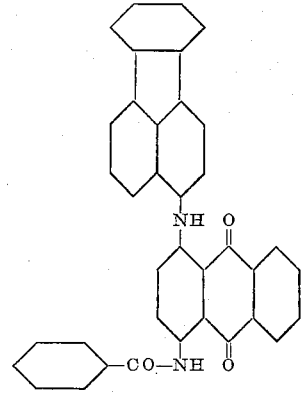

obtainable as described in Example 1, paragraph 2, of the copending application Serial No. 228,687 is introduced at 0–5° C. into 18.4 parts of sulfuric acid of 96 per cent strength and the mixture is stirred for 16 hours at 0–5° C. It is then introduced into ice, 0.3 part of sodium nitrite is added and the whole is stirred for 6 hours at 0–5° C. The dyestuff thus obtained is filtered, washed until neutral and made into a paste with water. It dyes cotton in a green vat deep yellow-olive tints.

*Example 3*

2 parts of di-(1'-anthraquinonyl)-diaminofluoranthene of the probable formula

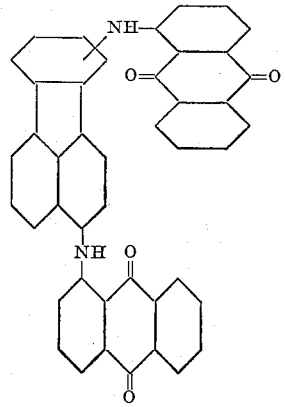

obtained as described in Example 2 of the copending application Serial No. 228,687 from 1 mol dibromofluoranthene and 2 mols 1-aminoanthraquinone, are introduced into 36 parts of concentrated sulfuric acid and the mixture is heated at 50–60° C. and stirred for 6 hours at this temperature. When cold the mass is introduced into ice, the whole is filtered and the solid matter washed neutral and dried. The dyestuff thus formed is a brown-black powder soluble in concentrated sulfuric acid to an olive-green solution and dyeing cotton in a red vat violet-brown fast tints.

*Example 4*

1 part of di-(1'-anthraquinonyl)-diaminofluoranthene (cf. Example 3), obtainable as described in Example 2 of the co-pending application Serial No. 228,687 is mixed with 10 parts of anhydrous aluminium chloride and while the mixture is stirred it is heated at 200-220° C. until the formation of dyestuff is complete. The mass is then introduced into ice and boiled with dilute hydrochloric acid; the solid matter is then filtered and washed with water. This dyestuff dyes cotton in a red-violet vat pure reddish-brown tints.

*Example 5*

24 parts of anhydrous aluminium chloride are mixed with 6 parts of common salt and the mixture is stirred in a molten condition at 120° C. There is then added 1 parts of di-(1'-anthraquinonyl)-diaminofluoranthene (cf. Example 3), obtainable as described in Example 2 of the copending application Serial No. 228,687 and the whole is stirred for 2 hours at 120-125° C. Finally the mass is introduced into ice and boiled with dilute hydrochloric acid; the dyestuff thus obtained is filtered. It is probably identical with that made as described in Example 4, being also a red-brown vat dyestuff.

A dyestuff having similar properties is obtained by treating di-(1'-anthraquinonyl)-diaminofluoranthene with anhydrous aluminium chloride in nitrobenzene at 100° C.

*Example 6*

1 part of di-(1'-anthraquinonyl)-diaminofluoranthene (cf. Example 3), obtainable as described in Example 2 of the copending application Serial No. 228,687 and 1 part of sodium amide, are mixed together in 3 parts of decaline and the mixture is heated until the formation of dyestuff is finished. The solid matter is now filtered and washed with alcohol and water. It is then a greenish-black powder soluble in concentrated sulfuric acid to a brown solution. It dyes cotton in a violet-brown vat olive tints.

*Example 7*

1 part of di-(4'-benzoylamino-1'-anthraquinonyl)-diaminofluoranthene of the probable formula

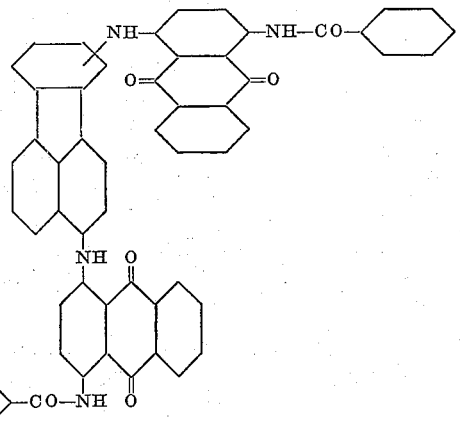

obtainable as described in Example 3, paragraph 1, of the copending application Serial No. 228,687, is introduced at 0-5° C. into 18 parts of sulfuric acid of 96.4 per cent strength, and the mixture is stirred for 16 hours at 0-5° C. It is then introduced into ice, 0.3 part of sodium nitrite is added, and the whole is strongly stirred for 1½ hours. The dyestuff which is produced in good yield may be filtered, washed and dried. It is a black-greenish iridescent powder soluble in concentrated sulfuric acid to a green solution and dyeing cotton in a violet vat somewhat reddish black-brown tints very fast to washing and kier boiling.

By brominating the dyestuff obtainable as described in the first paragraph of this example with the proportion of bromine necessary for introducing 2 atoms into the molecule in nitrobenzene at 80° C., there is obtained a new dyestuff which, when reprecipitated from sulfuric acid, dyes cotton brown-red in a brown vat.

A dyestuff of similar properties is obtained by brominating di-(4'-benzoylamino-1'-anthraquinonyl)-diaminofluoranthene with 4 atoms of bromine in sulfuric acid of 90 per cent strength, whereby the condensing action of the sulfuric acid occurs simultaneously with the bromination.

*Example 8*

1 part of di-(4'-benzoylamino-1'-anthraquinonyl)-diaminofluoranthene (cf. Example 7), obtainable as described in Example 4 of the copending application Serial No. 228,687 is introduced at 25° C. into 18.4 parts of sulfuric acid of 96.4 per cent strength, and the mixture is stirred for 5 hours at 25° C. It is now introduced into ice, 0.3 part of sodium nitrite is added, and the whole is stirred for 16 hours at 0-5° C. The dyestuff obtained in good yield is filtered, washed until neutral and made into a paste with water. It dyes cotton in an olive-black vat black-brown tints fast to washing, chlorine, kier boiling and especially to light.

*Example 10*

1 part of di-(4'-benzoylamino-1'-anthraquinonyl)-diaminofluoranthene (cf. Example 7), obtainable as described in Example 4 of the copending application Serial No. 228,687 is introduced at 60-65° C. into 18.2 parts of sulfuric acid of 90 per cent strength, and the mixture is stirred for 3-4 hours at 60-65° C. It is then introduced into ice, 0.3 part of sodium nitrite is added and the mixture is stirred at 0-5° C. for 16 hours. The dyestuff thus obtained is filtered, washed and made into a paste with water. It dyes cotton in a black-olive vat pure black-brown tints which have good fastness to washing, chlorine, kier boiling and light.

The condensation may also be conducted with a smaller proportion of sulfuric acid.

*Example 10*

1 part of di-(4'-benzoylamino-1'-anthraquinonyl)-diamino-fluoranthene (cf. Example 7), obtainable as described in Example 4 of the copending application Serial No. 228,687 is introduced at 0-5° C. into 18 parts of chlorosulfonic acid and the mixture is heated while stirring at 40-50° C. until the color of a test sample introduced into water no longer changes. The mass is now mixed while stirring with concentrated sulfuric acid, then introduced into ice water containing 0.3 part of sodium nitrite and the whole is stirred for 16 hours at 0-5° C. The dyestuff thus obtained is filtered, washed until neutral and made into a paste with water. It dyes cotton in an olive-black vat black-brown tints and is probably identical with the dyestuff obtained as described in Examples 7, 8 and 9.

A dyestuff of similar properties is obtained by treating di-(4'-benzoylamino-1'-anthraquinonyl)-diaminofluoranthene with anhydrous aluminium chloride in benzoyl chloride at 40-45° C. When the reaction is complete, the dyestuff is introduced into water which is then boiled until all the benzoyl chloride has disappeared; the dyestuff is then filtered and washed with hot water.

Instead of benzoyl chloride, acetyl chloride may be used.

*Example 11*

1 part of dibromo-di-(4'-benzoylamino-1'-anthraquinonyl)-diaminofluoranthene, obtainable as described in Example 3, paragraph 2, of the copending application Serial No. 228,687 is introduced at 0–5° C. into 18 parts of sulfuric acid of 96 per cent strength and the mixture is stirred for 16 hours at 0–5° C. It is then introduced into ice, 0.3 part of sodium nitrite is added and the whole is stirred for 8 hours at 0–5° C. The dyestuff thus obtained is filtered washed and made into a paste with water. It dyes cotton in a green-olive vat olive tints. It is probably identical with the dyestuff obtained as described in Example 15.

*Example 12*

1 part of di-(5'-benzoylamino-1'-anthraquinonyl)-diamino-fluoranthene of the probable formula

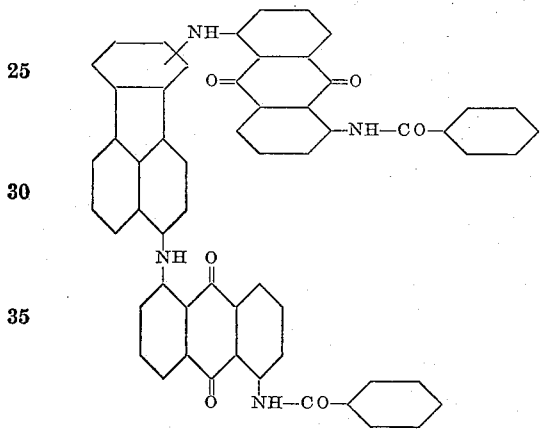

obtained as described in Example 5 of the copending application Serial No. 228,687 is introduced at 50–60° C. into 18.4 parts of sulfuric acid of 96.4 per cent strength and the mixture is stirred for 6 hours at 50–60° C. It is now introduced into ice and the dyestuff which has been precipitated is filtered and made into a paste after it has been thoroughly washed with water. It dyes cotton in a red-brown vat very fast brown tints.

*Example 13*

1 part of di-(5'-acetylamino-1'-anthraquinonyl)-diaminofluoranthene of the probable formula

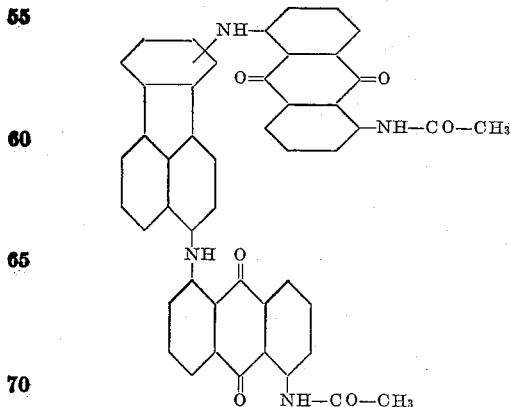

made as described in Example 6 paragraph 1, of the copending application Serial No. 228,687 from 1 mol dibromofluoranthene and 2 mols 1-amino-5-acetylaminoanthraquinone is introduced at 0–5° C. into 18 parts of sulfuric acid of 96 per cent strength and the mixture is stirred for 16 hours at 0–5° C. For completing the formation of dyestuff the mass is introduced into ice, 0.3 part of sodium nitrite are added and the whole is stirred for 6 hours at 0–5° C. and the solid matter then filtered and washed.

The dyestuff thus obtained dyes cotton in a red vat strong brown tints of good properties of fastness.

From di-(5'-(para-chloro)-benzoylamino-1'-anthraquinonyl)-diaminofluoranthene obtainable as described in Example 6, paragraph 2, of the said application there is obtained by stirring with concentrated sulfuric acid and subsequent treatment with nitrite a dyestuff which dyes cotton in a black-brown vat brownish tints.

The dyestuff similarly obtained from di-(5'-cinnamoylamino-1'-anthraquinonyl)-diaminofluoranthene (compare Example 6, paragraph 3, of the said application) dyes cotton in a yellow-brown vat very fast yellow-brown tints.

The dyestuff correspondingly made as described in Example 6, paragraph 4, of the said application from di-(5'-(β''-anthraquinonoyl)-amino-1'-anthraquinonyl)-diaminofluoranthene dyes cotton in a yellow-brown vat fast yellow-brown tints.

*Example 14*

1 part of tetra-(4'-benzoylamino-1'-anthraquinonyl)-tetraminofluoranthene of the probable formula

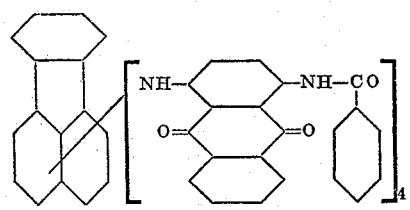

obtainable as described in Example 7, paragraph 1, of application No. 228,687, is introduced at 0–5° C. into 18.4 parts of sulfuric acid of 96 per cent strength, and the mixture is stirred at this temperature for 16 hours. The mass is then introduced into ice, 0.3 part of sodium nitrite is added and the whole is stirred for 2 hours at 0–5° C. The dyestuff thus obtained is filtered, washed and made into a paste with water. It dyes cotton in a black-brown vat grey tints.

*Example 15*

1 part of dibromo-di-(4'-benzoylamino-1'-anthraquinonyl)-diaminofluoranthene of the probable formula

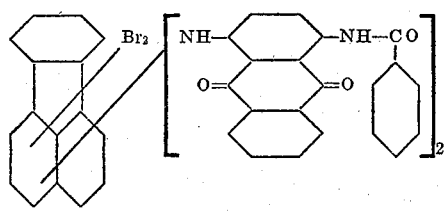

obtainable as described in Example 8 of the copending application Serial No. 228,687, is introduced at 0–5° C. into 18.4 parts of sulfuric acid of 96 per cent strength. The mixture is stirred for 16 hours at this temperature. The mass is then introduced into ice, 0.3 part of sodium nitrite is added and the whole is stirred for 2 hours at 0–5° C. The dyestuff thus obtained is filtered, washed and made into a paste with water. It dyes cotton in a green-yellow vat olive tints.

Example 16

1 part of the product of reaction of 1 mol dibromofluoranthene with 2 mols 4-aminoanthraquinone-2:1(N)-benzene-acridone of the probable formula

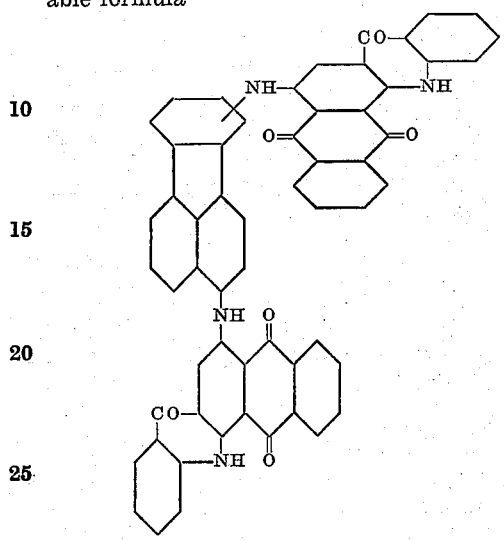

obtainable as described in Example 9 of the copending application Serial No. 288,687, is introduced into 18 parts of sulfuric acid of 96 per cent strength, and the mixture is stirred for 3 hours at 50–60° C. It is then introduced into ice, 0.3 part of sodium nitrite is added and the whole is stirred for 16 hours at 0–5° C. The solid matter, after washing and drying, is a black crystalline powder soluble in concentrated sulfuric acid to a blue solution and dyeing cotton in a violet-brown vat strong greenish-grey tints. The fastness, especially the fastness to light, is very good.

A dyestuff of similar properties is obtained when the condensation is conducted in anhydrous aluminium chloride in the presence of salt at 150° C.

Example 17

1 part of the product of the reaction of 1 mol dibromofluoranthene with 2 mols 5-amino-1:9-anthrapyrimidine of the probable formula

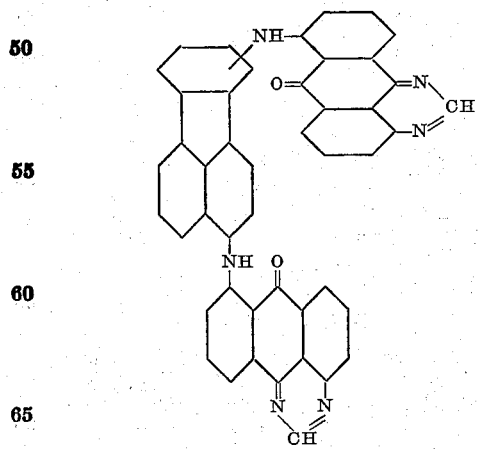

obtainable as described in Example 13, paragraph 1, of the copending application Serial No. 288,687, is introduced into 18 parts of sulfuric acid of 96 per cent strength and the mixture is stirred for 7 hours at room temperature. The mass is introduced into ice after oxidation with nitrite, the solid matter is filtered and washed. The dyestuff thus obtained is a black-red powder soluble in concentrated sulfuric acid to a grey-green solution and dyeing cotton in a yellow-brown vat dark brown tints.

Example 18

4.5 parts of the product of the reaction of 1 mol dibromofluoranthene with 1 mol of 1-amino-4-benzoylaminoanthraquinone of the probable formula

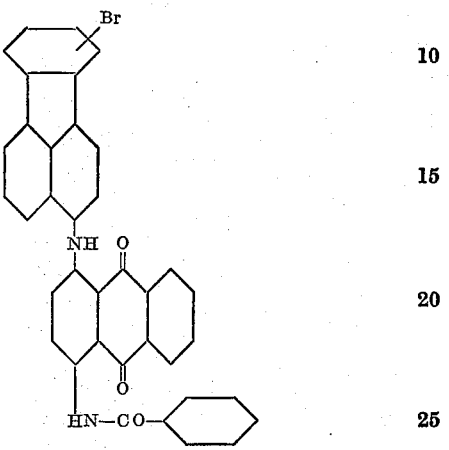

or

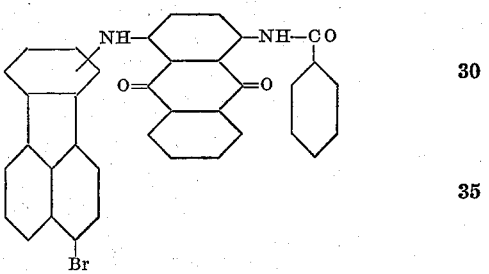

obtainable as described in Example 14, paragraph 1, of the copending application Serial No. 288,687, are introduced into 80 parts of sulfuric acid of 96 per cent strength and the mixture is stirred for 5 hours at room temperature. It is now poured on to ice and the dyestuff thus precipitated is filtered, washed and dried. It is an olive-black powder soluble in concentrated sulfuric acid to a yellow-green solution and dyeing cotton brownish tints in a black-brown vat.

3.1 parts of the dyestuff obtained as described in the preceding paragraph are caused to react with 2 parts of 1-amino-4-benzoylaminoanthraquinone in boiling nitrobenzene in presence of anhydrous sodium acetate, anhydrous sodium carbonate and cuprous chloride. There is obtained a black-olive powder which melts at 390–400° C., dissolves in concentrated sulfuric acid to a green solution and dyes cotton olive-brown tints in a brown vat.

1 part of the product of the reaction described in the last preceding paragraph is introduced into 18 parts of sulfuric acid of 96 per cent strength and the mixture is stirred for 3½ hours at 60–65° C. It is then poured upon ice, 0.3 part of sodium nitrite is added and the whole is stirred for 5 hours at 0–5° C. The very fast black-brown dyestuff thus obtained is practically identical with that described in Example 9.

The same dyestuff is obtained by treating the product of reaction of mono-(4'-benzoylamino-1'-anthraquinonyl) - amino - monobromofluoranthene and 1-amino-4-benzoylaminoanthraquinone, obtainable as described in Example 15, paragraph 1, of the copending application Serial No. 228,687 with concentrated sulfuric acid and subsequently oxidized with nitrite.

Example 19

1 part of the product of reaction of 1 mol mono-(4' - benzoylamino - 1'-anthraquinonyl)-amino-mono-bromofluoranthene with 1 mol of 1-amino-5-benzoylaminoanthraquinone of the probable formula

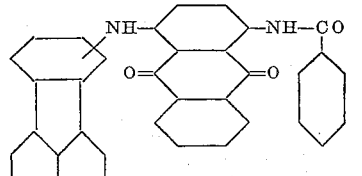

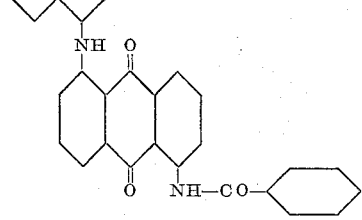

or

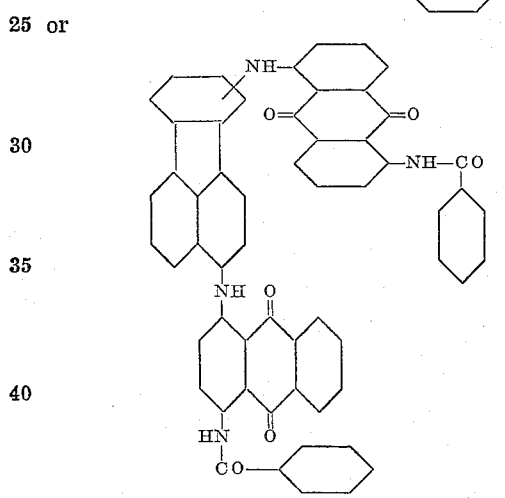

obtainable as described in Example 15, paragraph 2, of the copending application Serial No. 228,687, is introduced into 18 parts of sulfuric acid of 96 per cent strength, and the mixture is stirred for 5 hours at room temperature. It is now poured upon ice and the dyestuff thus precipitated is filtered, washed and dried. It is a black-brown powder, soluble in concentrated sulfuric acid to a green solution and dyeing cotton in a red-brown vat fast brown tints.

Similar dyestuffs are obtainable if there is used for the treatment with sulfuric acid of high per cent strength either the product of reaction of 1 mol mono - (5'-benzoylamino-1'-anthraquinonyl) - aminomonobromofluoranthene with 1 mol 1-amino - 4-benzoylaminoanthraquinone or the product which is obtained by the simultaneous reaction of 1 mol dibromofluoranthene with 1 mol 1-amino - 4 - benzoylaminoanthraquinone and 1 mol 1 - amino-5-benzoylaminoanthraquinone (see Example 15, paragraph 3, of the copending application Serial No. 228,687).

Example 20

1 part of the product of the reaction of mono-(4' - benzoylamino - 1'-anthraquinonyl)-amino-monobromofluoranthene with 5 - amino-isothiazolanthrone, obtainable as described in Example 16, paragraph 1, of the copending application Serial No. 228,687, is introduced into 18 parts of sulfuric acid of 96 per cent strength and the mixture is stirred for 5 hours at room temperature. It is now poured upon ice, 0.3 part of sodium nitrite is added and the whole is stirred for 16 hours at 0–5° C. The dyestuff thus produced is filtered and washed. It dissolves in sulfuric acid to a green solution and dyes cotton brown tints in a violet-brown vat.

By treating the product of reaction of mono-(4' - benzoylamino - 1'-anthraquinonyl)-amino-monobromofluoranthene with 4 - amino - N-methyl-1:9-anthrapyridone, made as described in Example 16, paragraph 2, of the copending application Serial No. 228,687, with sulfuric acid there is obtained a dyestuff which dyes cotton black-violet tints in a violet-brown vat.

The product of the reaction of mono-(4'-benzoylamino-1'-anthraquinonyl) - amino-mono-bromofluoranthene with 5-amino - 1:9-anthrapyrimidine (Example 16, paragraph 3, of the copending application Serial No. 228,687) yields when treated with sulfuric acid of high per cent strength a black-brown powder which dyes cotton black-brown in a red-brown vat.

A dyestuff which dies cotton dark brown in a brown vat is obtained when the product of reaction of 1 mol mono-(4'-benzoylaminoanthraquinonyl) - amino-monobromofluoranthene with 1 mol 4-amino-1:9-anthrapyrimidine, obtainable as described in Example 16, paragraph 4, of the copending application Serial No. 228,687, is treated with concentrated sulfuric acid.

What we claim is:

1. Process for the manufacture of nitrogenous condensation products of fluoranthene, comprising causing condensing agents to react with compounds of the general formula $(R_1-NH)_n-R_2$, wherein $R_1$ stands for a radical of a compound capable of being vatted, which contains at least three condensed six-membered carbon rings as well as at least one carbonyl group, the carbon atom of which is a member of a six-membered ring, $n$ stands at least for the number 1, and $R_2$ stands for a fluoranthene radical.

2. Process for the manufacture of nitrogenous condensation products of fluoranthene, comprising causing acid condensing agents to react with compounds of the general formula $$(R_1-NH)_n-R_2$$

wherein $R_1$ stands for a radical of a compound capable of being vatted, which contains at least three condensed six-membered carbon rings as well as at least one carbonyl group, the carbon atom of which is a member of a six-membered ring, $n$ stands at least for the number 1, and $R_2$ stands for a fluoranthene radical.

3. Process for the manufacture of nitrogenous condensation products of fluoranthene, comprising causing acid condensing agents to react with compounds of the general formula $$R_1-NH-R_2-NH-R_3$$

wherein $R_1$ and $R_3$ stand for one radical each of a compound capable of being vatted, which contains at least three condensed six-membered carbon rings as well as at least one carbonyl group, the carbon atom of which is a member of a six-membered ring, and $R_2$ stands for a fluoranthene radical.

4. Process for the manufacture of nitrogenous condensation products of fluoranthene, comprising causing acid condensing agents to react with compounds of the general formula $$R_1-NH-R_2-NH-R_3$$

wherein one of the radicals $R_1$ and $R_3$ stands for an anthraquinone radical, the other stands for a radical of a compound capable of being vatted, which contains at least three condensed six-membered carbon rings as well as at least one carbonyl group, the carbon atom of which is a member of a six-membered ring, and R₂ stands for a fluoranthene radical.

5. Process for the manufacture of nitrogenous condensation products of fluoranthene, comprising causing acid condensing agents to react with compounds of the general formula

wherein R₁ and R₃ stand for anthraquinone radicals containing at least one acylamino-group and R₂ stands for a fluoranthene radical.

6. Process for the manufacture of nitrogenous condensation products of fluoranthene, comprising causing highly concentrated sulfuric acid to react with compounds of the general formula

wherein R₁ and R₃ stand for one radical each of a compound capable of being vatted, which contains at least three condensed six-membered carbon rings as well as at least one carbonyl group, the carbon atom of which is a member of a six-membered ring, and R₂ stands for a fluoranthene radical.

7. Process for the manufacture of nitrogenous condensation products of fluoranthene, comprising causing highly concentrated sulfuric acid to react with compounds of the general formula

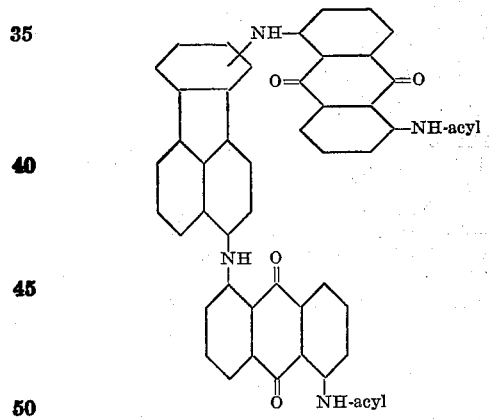

8. Process for the manufacture of nitrogenous condensation products of fluoranthene, comprising causing highly concentrated sulfuric acid to react with compounds of the general formula

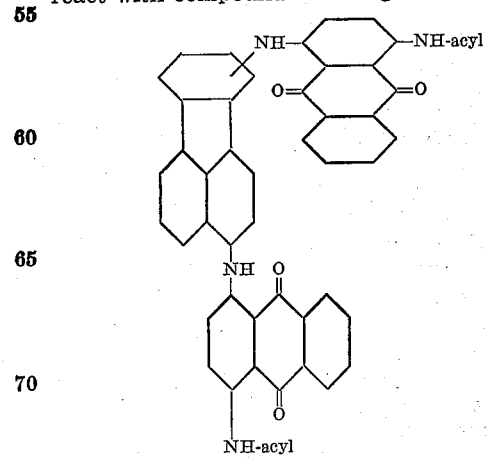

9. Process for the manufacture of nitrogenous condensation products of fluoranthene, comprising causing highly concentrated sulfuric acid to react with compounds of the general formula

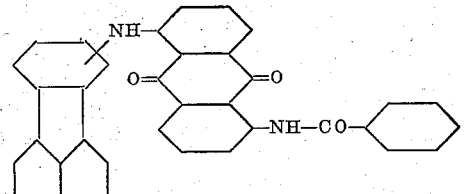

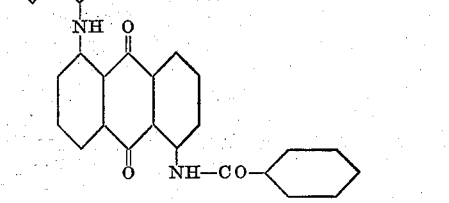

10. Process for the manufacture of nitrogenous condensation products of fluoranthene, comprising causing highly concentrated sulfuric acid to react with compounds of the general formula

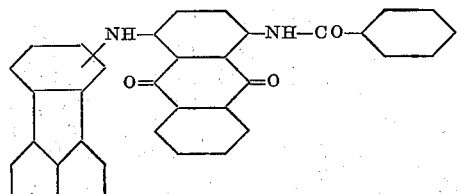

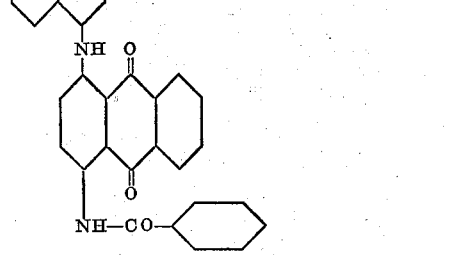

11. Process for the manufacture of nitrogenous condensation products of fluoranthene, comprising causing highly concentrated sulfuric acid to react with compounds of the general formula

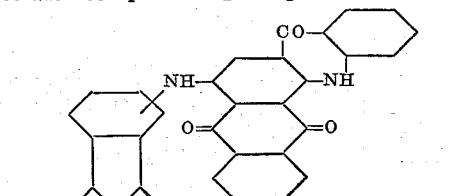

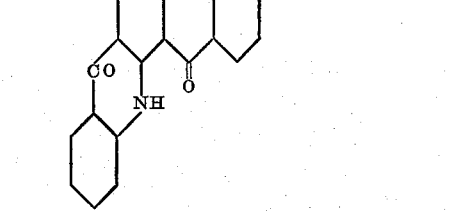

12. Products of the general formula

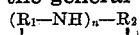

wherein R₁ stands for a radical of a compound capable of being vatted, which contains at least three condensed six-membered carbon rings as well as at least one carbonyl group, the carbon atom of which is a member of a six-membered ring, $n$ stands at least for the number 1, and $R_2$ stands for a fluoranthene radical, and wherein a carbon atom of at least one radical $R_1$ adjacent to the NH-group is linked to a carbon atom of the fluoranthene radical $R_2$ adjacent to the NH-group.

13. Products of the general formula

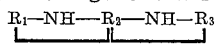

wherein $R_1$ and $R_3$ stand for a radical of a compound capable of being vatted, which contains at least three condensed six-membered carbon rings as well as at least one carbonyl group, the carbon atom of which is a member of a six-membered ring and $R_2$ stands for a fluoranthene radical, and wherein a carbon atom of the radicals $R_1$ and $R_3$ adjacent to the NH-group is linked to one carbon atom each of the fluoranthene radical $R_2$ adjacent to the NH-group 14. Products of the general formula

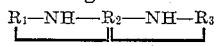

wherein $R_1$ and $R_3$ stand for anthraquinone radicals containing at least one acylamino-group and $R_2$ stands for a fluoranthene radical, and wherein a carbon atom of the radicals $R_1$ and $R_3$ adjacent to the NH-group is linked to one carbon atom each of the fluoranthene radical $R_2$ adjacent to the NH-group.

15. Products of the general formula

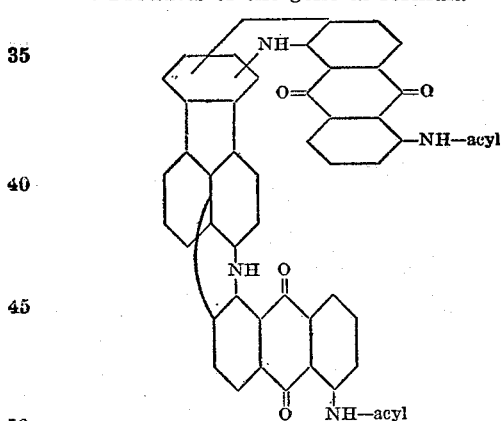

wherein the linking positions of the NH-linkage and of the carbon linkage are adjacent in the fluoranthene nucleus.

16. Products of the general formula

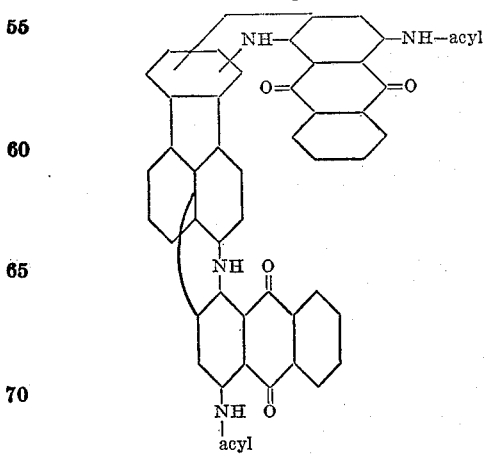

wherein the linking positions of the NH-linkage and of the carbon linkage are adjacent in the fluoranthene nucleus.

17. Products of the general formula

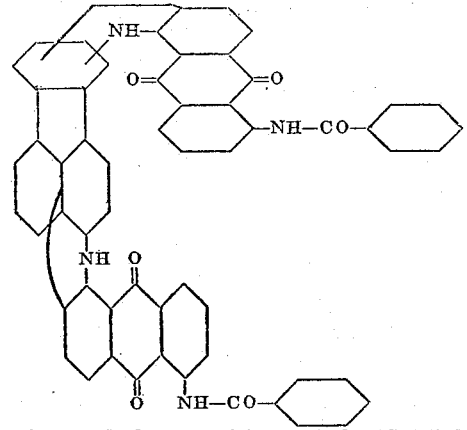

wherein the linking positions of the NH-linkage and of the carbon linkage are adjacent in the fluoranthene nucleus.

18. Products of the general formula

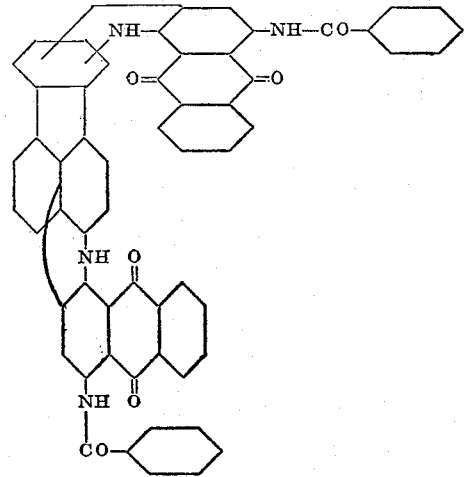

wherein the linking positions of the NH-linkage and of the carbon linkage are adjacent in the fluoranthene nucleus.

19. Products of the general formula

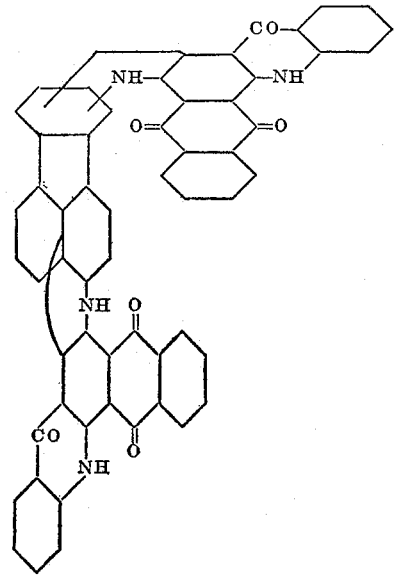

wherein the linking positions of the NH-linkage and of the carbon linkage are adjacent in the fluoranthene nucleus.

WALTER KERN.
THEODOR HOLBRO.
RICHARD TOBLER.